(12) United States Patent
Gao et al.

(10) Patent No.: US 10,634,881 B2
(45) Date of Patent: Apr. 28, 2020

(54) COMPACT NON-MECHANICAL ZOOM LENS HAVING FOCAL LENGTHS DEPENDENT UPON LEFT- OR RIGHT-HANDEDNESS OF CIRCULARLY POLARIZED LIGHT

(71) Applicants: Kent State University, Kent, OH (US); Intel Corporation, Santa Clara, CA (US)

(72) Inventors: Kun Gao, San Jose, CA (US); Hsien-Hui Cheng, San Jose, CA (US); Philip Bos, Hudson, OH (US); Colin P. McGinty, Brooklyn, OH (US); Achintya Bhowmik, Santa Clara, CA (US)

(73) Assignee: Kent State University, Kent, OH (US)

( * ) Notice: Subject to any disclaimer, the term of this patent is extended or adjusted under 35 U.S.C. 154(b) by 191 days.

(21) Appl. No.: 15/561,288

(22) PCT Filed: Mar. 25, 2016

(86) PCT No.: PCT/US2016/024218
§ 371 (c)(1),
(2) Date: Sep. 25, 2017

(87) PCT Pub. No.: WO2016/154537
PCT Pub. Date: Sep. 29, 2016

(65) Prior Publication Data
US 2018/0129018 A1 May 10, 2018

Related U.S. Application Data

(60) Provisional application No. 62/138,678, filed on Mar. 26, 2015.

(51) Int. Cl.
*G02B 5/30* (2006.01)
*G02B 13/00* (2006.01)
*G02B 27/28* (2006.01)

(52) U.S. Cl.
CPC ......... *G02B 13/009* (2013.01); *G02B 5/3008* (2013.01); *G02B 5/3083* (2013.01); *G02B 27/286* (2013.01)

(58) Field of Classification Search
CPC .......... G02B 3/0081; G02B 2003/0093; G02B 3/02; G02B 3/10; G02B 5/3008;
(Continued)

(56) References Cited

U.S. PATENT DOCUMENTS

| | | |
|---|---|---|
| 2001/0000971 A1 | 10/2001 | Johnson et al. |
| 2009/0141216 A1 | 6/2009 | Marrucci |

(Continued)

OTHER PUBLICATIONS

Intel Corporation, et al., "Intel RealSense Technology" downloaded at www.intel.com/realsense, on Apr. 20, 2018.
(Continued)

*Primary Examiner* — Ryan S Dunning
(74) *Attorney, Agent, or Firm* — Fay Sharpe LLP

(57) ABSTRACT

An optical magnification system comprises two Pancharatnam lenses, and provides a first magnification for left-hand circularly polarized light and a second magnification different from the first magnification for right-hand circularly polarized light. An optical magnification system comprises two lenses, each having different focal lengths for left-handed and right-handed circularly polarized light, respectively, and configured to provide a first magnification for left-handed circularly polarized light and a second magnification different from the first magnification for right-handed circularly polarized light.

19 Claims, 13 Drawing Sheets

(58) Field of Classification Search
CPC .. G02B 5/3016; G02B 5/3075; G02B 5/3083; G02B 5/3091; G02B 5/32; G02B 13/0015; G02B 13/0055; G02B 13/006; G02B 13/007; G02B 13/008; G02B 13/009; G02B 13/14; G02B 13/143; G02B 13/146; G02B 27/0075; G02B 27/286; G03H 2001/221; G03H 2223/17; G11B 7/1365; G11B 7/1367; G11B 7/1369; G11B 7/1372; G11B 7/13727; G11B 11/10539
USPC .... 359/19, 354–357, 371, 386, 435, 489.14, 359/489.18, 581, 676, 679, 694, 708, 715, 359/721, 738, 771, 796, 809; 369/112.16–112.2, 112.23–112.26
See application file for complete search history.

(56) References Cited

U.S. PATENT DOCUMENTS

| | | | |
|---|---|---|---|
| 2009/0257106 | A1 | 10/2009 | Tan et al. |
| 2012/0099413 | A1* | 4/2012 | Sharp ................. G02B 5/3083 369/112.16 |
| 2015/0301356 | A1* | 10/2015 | Tabirian ................. G02C 7/022 623/6.31 |
| 2018/0275410 | A1* | 9/2018 | Yeoh .................... H04N 13/344 |
| 2018/0356639 | A1* | 12/2018 | Schaefer ............ G02B 27/0172 |
| 2018/0356704 | A1* | 12/2018 | Tabirian .................... G02F 1/29 |
| 2019/0171026 | A1* | 6/2019 | Parsons ................ G02B 27/123 |

OTHER PUBLICATIONS

Marrucci, et al., "Pancharatnam-Berry phase optical elements for wave front shaping in the visible domain: Switchable helical mode generation," Appl. Phys. Lett. 88, pp. 221102-1 to 221102-3 (2006).

Hasman, et al., "Polarization dependent focusing lens by use of quantized Pancharatnam-Berry phase diffractive optics," Appl. Phys. Lett. 82, pp. 328-330 (2003).

Gorodetski, et al., "Optical properties of polarization-dependent geometric phase elements with partially polarized light," Opt. Commun. 266, pp. 365-375 (2006).

Escuti, et al., "Simplified spectropolarimetry using reactive mesogen polarization gratings," Proc. SPIE. 6302, pp. 630207-1 to 630207-11 (2006).

Escuti, et al., "Polarization independent switching with high contrast from a liquid crystal polarization grating," SID Sym. Dig. Tech. Papers 37, pp. 1443-1446 (2006).

Crawford, et al., "Liquid-crystal diffraction gratings using polarization holography alignment techniques," J. Appl. Phys. 98, pp. 123102-1 to 123102-10 (2005).

Lin, et al., "An electrically tunable optical zoom system using two composite liquid crystal lenses with a large zoom ratio," Opt. Express. 19, pp. 4714-4721 (2011).

International Search Report dated Jun. 20, 2016 in International application No. PCT/US2016/024218.

Written Opinion dated Jun. 20, 2016 in International application No. PCT/US2016/024218.

International Preliminary Report on Patentability dated Sep. 26, 2017 in International application No. PCT/US2016/024218.

\* cited by examiner

COMPACT NON-MECHANICAL ZOOM LENS HAVING FOCAL LENGTHS DEPENDENT UPON LEFT- OR RIGHT-HANDEDNESS OF CIRCULARLY POLARIZED LIGHT

This application is a national stage entry of PCT/US2016/024218 filed Mar. 25, 2016 and titled "COMPACT NON-MECHANICAL ZOOM LENS" which claims the benefit of U.S. Provisional Application No. 62/138,678 filed Mar. 26, 2015 and titled "COMPACT NON-MECHANICAL ZOOM LENS". U.S. Provisional Application No. 62/138,678 filed Mar. 26, 2015 and titled "COMPACT NON-MECHANICAL ZOOM LENS" is incorporated herein by reference in its entirety.

BACKGROUND

The following relates to the optical device arts, optical lens arts, zoom lens arts, and related arts.

Adjustable zoom lenses find diverse applications, such as in machine vision inspection systems, computer vision systems used as input devices by computers, gaming consoles, mobile devices (cell phones, tablet computers, laptop computers), and other interactive electronic devices, and so forth. In a typical system, a monochromatic imaging device including a lens and a digital imaging array (e.g. CCD array, CMOS imaging array, or so forth) is provided along with an illuminator outputting at an infrared wavelength or other wavelength of interest for real-time image capture and processing. Monochromatic illumination is useful to avoid chromatic aberration or other chromatic distortion effects, but polychromatic illumination may also be used to obtain beneficial spectral information. In one approach, the imaging system employs a fixed-lens camera that captures the entire frame within the camera's field of view, and subsequent image processing is employed to isolate and identify a feature of interest of an object under inspection, or to isolate and recognize a user input action.

In such a system, the field of view must be large enough to ensure the object feature, user action of interest, or the like is captured in the image. However, providing a sufficiently large field of view may limit the spatial resolution. To avoid this limitation, an optical zoom can be provided. In this variant, the zoom is adjusted to provide a wide field of view. Image processing is applied to the wide-field image to identify a feature of interest, which is then zoomed in and imaged at higher resolution.

However, mechanical zoom lens systems are typically bulky, and the zoom speed is limited by the mechanical response time of the zoom system. This can be problematic for systems that need to be made small, such as a user interface camera designed to fit into the bezel of a portable computer or mobile device, or in systems or devices needing high speed zoom adjustment.

BRIEF SUMMARY

In one illustrative embodiment, an optical magnification system includes a first composite lens comprising a first Pancharatnam lens and a first polarization-independent lens, and a second composite lens comprising a second Pancharatnam lens and a second polarization-independent lens. The first composite lens is arranged to output light into the second composite lens.

In another illustrative embodiment, a zoom system comprises an optical magnification system as set forth in the immediately preceding paragraph, and an electro-optic polarization element or sub-system configured to input circularly polarized light to the first composite lens of the optical magnification system. The electro-optic polarization element or sub-system is configured to electrically switch the circularly polarized light between left-handedness and right-handedness.

In another illustrative embodiment, an optical magnification system is disclosed. A first lens has a positive focal length $f_+$ for circularly polarized light of a first handedness and a negative focal length of magnitude $f_-$ for circularly polarized light of a second handedness opposite the first handedness. A second lens has a positive focal length $f_+$ for circularly polarized light of the first handedness and a negative focal length of magnitude $f_-$ for circularly polarized light of the second handedness. In the optical magnification system, the first lens is arranged to output into the second lens. In some embodiments of the optical magnification system, the first and second lenses are spaced apart by a distance $f_+ - f_-$. In some embodiments of the optical magnification system, the first and second lenses each include a Pancharatnam lens. In some embodiments, the optical magnification system has no moving parts.

In another illustrative embodiment, a zoom apparatus comprises an optical magnification system as set forth in the immediately preceding paragraph, and an electro-optic polarization element or sub-system configured to input circularly polarized light to the first lens of the optical magnification system. The electro-optic polarization element or sub-system is configured to electrically switch the circularly polarized light between left-handedness and right-handedness. In some embodiments the zoom apparatus has a total thickness of 1.0 cm or less and has an f-number of 2 or lower. In some embodiments the zoom apparatus has a total thickness of 5.0 mm or less and has an f-number of 2 or lower.

In another illustrative embodiment, an optical magnification system comprises a first composite lens and a second composite lens. The first composite lens includes (i) a polarization-dependent lens that switches from a positive focal length for circularly polarized light of a first handedness to a negative focal length for circularly polarized light of a second handedness opposite the first handedness and (ii) a polarization-independent lens. The second composite lens includes (i) a polarization-dependent lens that switches from a positive focal length for circularly polarized light of the first handedness to a negative focal length for circularly polarized light of the second handedness and (ii) a polarization-independent lens. The first composite lens and the second composite lens are arranged in an optical train with the first composite lens and the second composite lens spaced apart such that the optical train provides a first magnification for circularly polarized light of the first handedness and a second magnification different from the first magnification for circularly polarized light of the second handedness.

In another illustrative embodiment, an optical magnification system comprises two Pancharatnam lenses. The optical magnification system provides a first magnification for left-hand circularly polarized light and a second magnification different from the first magnification for right-hand circularly polarized light. In some embodiments of the optical magnification system, the first composite lens including a first Pancharatnam lens of the two Pancharatnam lenses and at least one additional lens that is not a Pancharatnam lens, and the second composite lens includes a second Pancharatnam lens of the two Pancharatnam lenses and at least one additional lens that is not a Pancharatnam lens.

DETAILED DESCRIPTION

Disclosed herein are non-mechanical optical zoom systems that leverage certain characteristics of Pancharatnam phase lenses to achieve electrical switching of the optical zoom system between two (or more) zoom settings, e.g. between two different magnifications. Pancharatnam lenses provide focusing of circularly polarized light. The illustrative optical zoom systems leverage a particular property of Pancharatnam phase lenses, namely that the focal length of a Pancharatnam lens switches sign (i.e. switches between a positive focal length and a negative focal length of the same magnitude) when the sign of the circularly polarized light is switched between left-hand circular polarization and right-hand polarization (or, using a different nomenclature, between counter-clockwise circular polarization and clockwise circular polarization). This transformation from a positive lens to a negative lens based on the handedness of the circularly polarized input light, which is a property of the Pancharatnam lens, is advantageously leveraged by constructing a zoom lens system employing at least two Pancharatam lenses, optionally in conjunction with additional lenses, and performing electrical switching of the zoom setting by electrically switching the handedness of the input circularly polarized light. In the illustrative zoom systems, the Pancharatnam lens itself is a static, i.e. passive, device (although it is contemplated for the Pancharatnam to be an electro-optic device in which electrical lens bias is used to adjust the magnitude of the focal length of the Pancharatnam lens).

Advantageously, numerous optical configurations are known for producing circularly polarized light and for high-speed switching of the handedness of circularly polarized light—thus, the disclosed optical zoom systems provide low cost, high-speed-switchable zoom systems. As a further benefit, the Pancharatnam lens can be constructed as a thin film on the order of 1.5 micron thickness, and can be stacked with other lenses and combined with planar polarizer and phase retarder elements to construct a compact electrically switchable zoom system in a low-profile (i.e. thin) package suitable for installation in confined spaces such as in the bezel of a mobile device.

Figure 1:
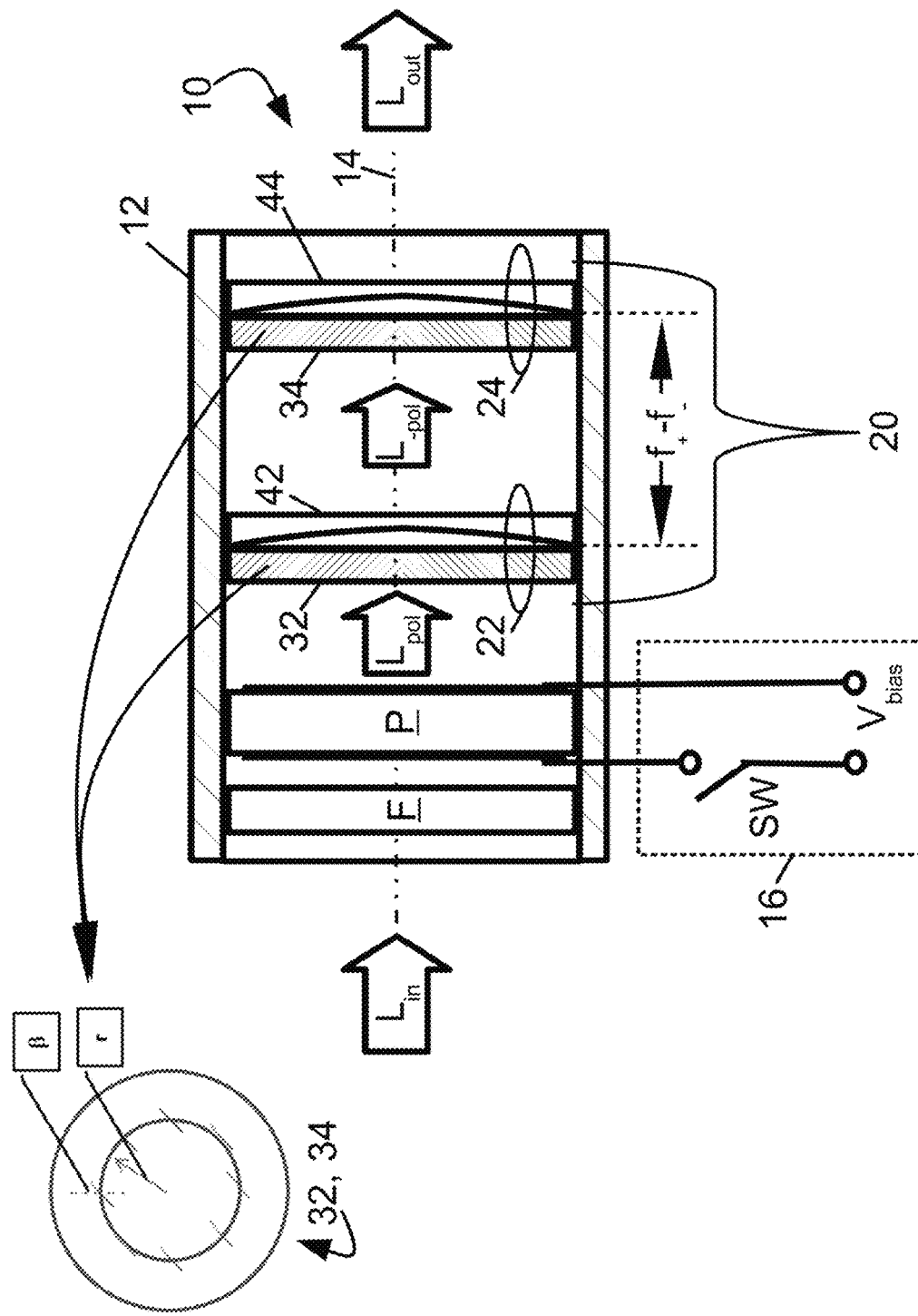
FIG. 1 diagrammatically shows a side sectional view of a compact non-mechanical optical zoom package providing two electrically switchable zoom settings. The inset at upper left diagrammatically shows a plan view of a Pancharatnam lens, two of which are included in the illustrative optical zoom package of FIG. 1.

With reference to FIG. 1, in an illustrative embodiment a non-mechanical electrically switchable optical zoom apparatus or system 10 is housed in a tubular housing 12 (shown in side sectional view) defining a cylinder axis 14 which also is the optical axis 14 of the zoom system 10. The illustrative tubular housing 12 is assumed to have a circular cross-section, but other cross-sectional shapes are contemplated (e.g. a square, hexagonal, or other cross-section). Input light ($L_{in}$) enters the tubular housing 12 of the illustrative zoom system 10 from the left, and output light ($L_{out}$) exits the tubular housing 12 of the zoom system 10 at the right. The input light ($L_{in}$) is optionally spectrally filtered, e.g. by a narrow bandpass filter F, to provide monochromatic light. Alternatively, if the input light ($L_{in}$) is already monochromatic, (for example, generated by a laser or semiconductor light emitting diode (LED) device, then the filter F may be omitted. In other variant embodiments, the filter may be placed elsewhere in the optical train, e.g. at the right end to spectrally filter the output light ($L_{out}$). It will be appreciated that in a practical optical system, the monochromatic light will have some finite FWHM that depends on the FWHM spectral characteristics of the filter F, laser, LED or the like. If the lenses of the zoom apparatus have low chromatic aberration then it is also contemplated to employ broadband or polychromatic light without spectral filtering.

The input light ($L_{in}$) is polarized by an electro-optic polarization element or sub-system P, which may take various configurations. In general, the input light ($L_{in}$) processed by the electro-optic polarization element or sub-system P should produce polarized light ($L_{pol}$) that is circularly polarized, and whose handedness of circular polarization can be switched between left handedness and right handedness by operation of a switching electrical bias source 16. In the illustrative bias configuration 16, an electrical bias voltage ($V_{bias}$) is selectively applied to the electro-optic polarization element or sub-system P by way of a switch SW, but other electrically switchable biasing arrangements are suitable. The electro-optic polarization element or sub-system P can have various configurations (details not shown). In one configuration, the input light ($L_{in}$) is unpolarized and the polarization element or sub-system P comprises a linear polarizer and a switchable phase retarder that switchable between a $-\pi/2$ phase retardation and a $+\pi/2$ phase retardation by action of the switchable electrical biasing arrangement 16. In another configuration, the input light ($L_{in}$) is already circularly polarized and the polarization element or sub-system P includes an electrically switchable 0-$\pi$ phase retarder. These are merely illustrative examples. It is also contemplated to place the polarization element or sub-system P elsewhere in the optical train, such as at the light output end to polarize the output light ($L_{out}$) in an arrangement sometimes referred to as an "analyzer" arrangement.

With continuing reference to FIG. 1, the zoom apparatus 10 further includes an optical magnification train 20 including a first compound lens 22 and a second compound lens 24. The first compound lens 22 includes a (first) Pancharatnam lens 32, while the second compound lens 24 includes a (second) Pancharatnam lens 34. In the illustrative embodiment, both Pancharatnam lenses 32, 34 are identical and have the same "handedness"—in other words, one of the following holds: (1) both Pancharatnam lenses 32, 34 operate as a positive lens for left-hand circularly polarized light and operate as a negative lens for right-hand circularly polarized light, or (2) both Pancharatnam lenses 32, 34 operate as a negative lens for left-hand circularly polarized light and operate as a positive lens for right-hand circularly polarized light.

Figure 2:
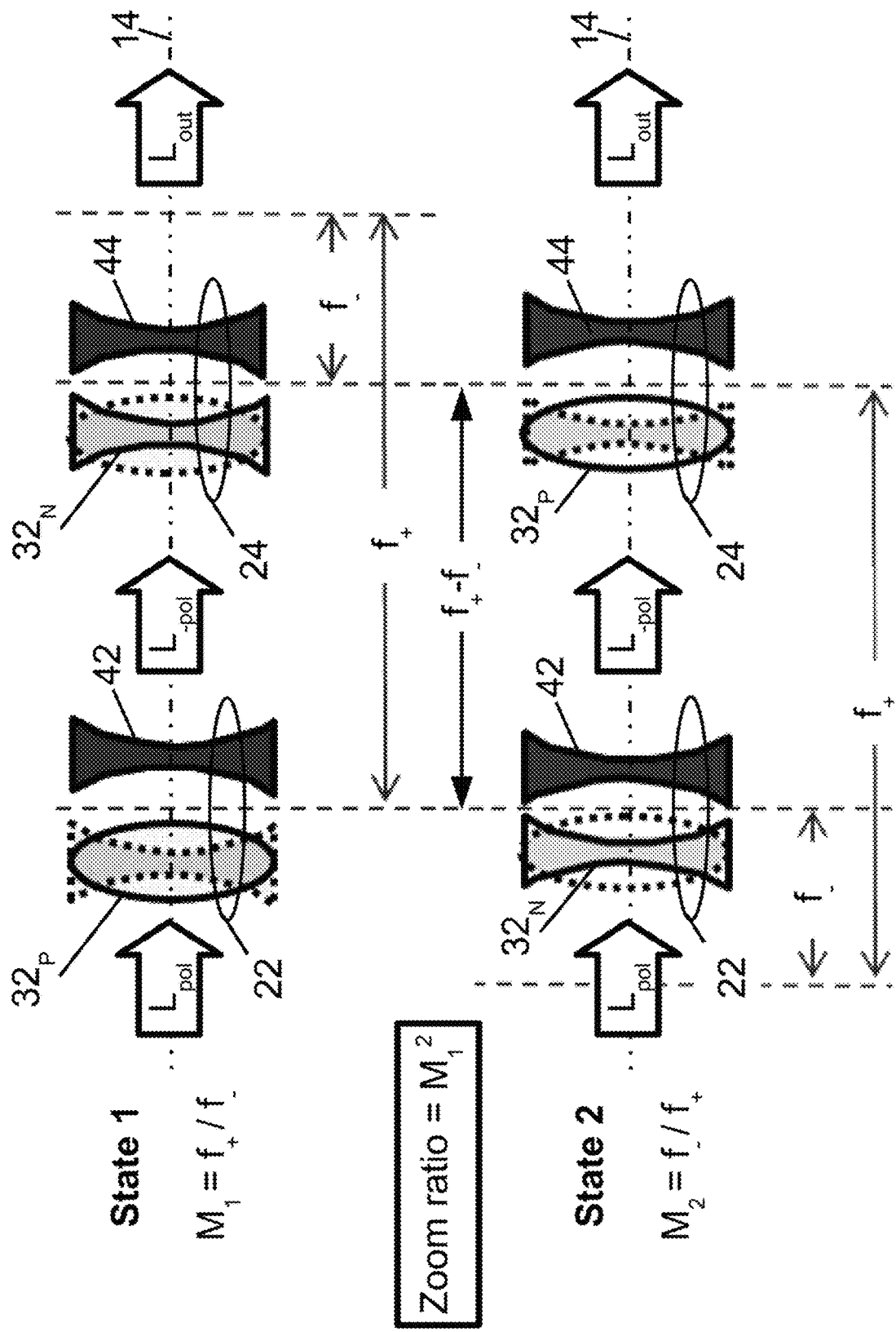
FIG. 2 diagrammatically shows the focal lengths of the two compound lenses in the two electrically switchable states: State 1 and State 2, of the compact non-mechanical optical zoom package of FIG. 1.

With reference to FIG. 1 and with further reference to FIG. 2, the illustrative optical magnification train 20 leverages another property of a Pancharatnam lens, namely that a Pancharatnam lens operates as a half-wave plate that reverses the handedness of the circularly polarized light. The impact of this on the optical magnification train 20 is best seen with reference to FIG. 2, which depicts the optical magnification train 20 of the zoom apparatus 10 of FIG. 1 in a "State 1" (FIG. 2 top diagram) corresponding to one particular handedness of the circularly polarized input light ($L_{pol}$), and in a "State 2" (FIG. 2 bottom diagram) corresponding to the opposite handedness of the circularly polarized input light ($L_{pol}$). Since, as described with reference to FIG. 1, the handedness of the circularly polarized input light ($L_{pol}$) can be switched by switching the bias applied to the polarization element or sub-system P, it follows that the optical magnification train can be switched between State 1 and State 2 merely by electrically switching the polarization element or sub-system P using the electrical bias source 16.

State 1 is considered first. In the diagrammatic example of FIG. 2, in State 1 the circularly polarized light ($L_{pol}$) has handedness such that the first Pancharatnam lens operates as a positive lens, and hence is indicated in FIG. 2, top diagram, as Pancharatnam lens $32_P$ (for State 1). The output light ($L_{-pol}$) has opposite handedness from light ($L_{pol}$) due to the half-wave plate property of Pancharatnam lenses, so that the light ($L_{-pol}$) of opposite handedness input to the second Pancharatnam lens causes the second Pancharatnam lens to operate as a negative lens, and hence is indicated in FIG. 2, top diagram, as Pancharatnam lens $34_N$ (for State 1).

State 2 is next considered. In the diagrammatic example of FIG. 2, in State 2 the circularly polarized light ($L_{pol}$) has handedness such that the first Pancharatnam lens operates as a negative lens, and hence is indicated in FIG. 2, bottom diagram, as Pancharatnam lens $32_N$ (for State 2). The output light ($L_{-pol}$) has opposite handedness from light ($L_{pol}$) due to the half-wave plate property of Pancharatnam lenses, so that the light ($L_{-pol}$) of opposite handedness input to the second Pancharatnam lens causes the second Pancharatnam lens to operate as a positive lens, and hence is indicated in FIG. 2, bottom diagram, as Pancharatnam lens $34_P$ (for State 2).

With continuing reference to FIGS. 1 and 2, the first compound lens 22 further includes an additional lens 42, while the second compound lens 24 includes an additional lens 44. In the illustrative embodiment, both lenses 42, 44 are identical, and are negative lenses. The negative lenses 42, 44 may be plano-concave lenses (as shown in FIG. 1; see also FIGS. 3 and 4), or alternatively may be bi-concave lenses (as diagrammatically shown in FIG. 2). In other embodiments, the lenses 42, 44 may be negative lenses of other types, e.g. formed as electro-optic devices, e.g. liquid crystal-based lenses. The illustrative optical magnification train 20 has a Galilean telescope topology in which one (compound) lens is a positive lens and the other (compound) lens is a negative lens. Without loss of generality, the positive lens of the Galilean telescope topology is designated as having a positive focal length $f_+$ and the negative lens of the Galilean telescope topology is designated as having a negative focal length of magnitude $f_-$ where in illustrative FIGS. 1 and 2 the inequality $f_+>f_-$ holds. In the Galilean telescope topology, the positive and negative lenses are separated by a distance $f_+-f_-$. As will be explained in more detail below, the disclosed compound lenses 22, 24 are switchable between having positive focal length $f_+$ and negative focal length of magnitude $f_-$ (or, written another way, focal length $-f_-$). As shown in FIGS. 1 and 2, the two compound lenses 22, 24 are separated by the distance $f_+-f_-$ in accordance with the illustrative Galilean telescope topology. An advantage of this topology is that the separation is reduced as compared with, by way of further example, an optical magnification train with an astronomical telescope topology made of two positive lenses separated by the sum of their focal lengths.

It should be noted that in the illustrative examples herein, each of the compound lenses 22, 24 is analyzed mathematically using the "thin lens" approximation, which assumes that the separation between the constituent lenses (that is, between lenses 32, 42 in compound lens 22, and likewise between lenses 34, 44 in compound lens 24) can be neglected in the analysis. This is a good approximation to first order, especially when the constituent lenses 32, 34, 42, 44 are thin, which is the case for typical Pancharatnam lenses which comprise 1.5 micron refractive layers, and may be the case for the lenses 42, 44 if they are made thin using high refractive index optical materials. If greater precision is desired, the disclosed optical analyses can readily be refined using numerical (e.g. ray tracing) optical design software. A consequence of the "thin lens" approximation used herein is that the separation between the compound lenses 22, 24 can be treated as equal to the separation between the Pancharatnam lenses 32, 34, both being designated by $f_+-f_-$.

As shown in FIG. 1, the illustrative non-mechanical electrically switchable zoom lens 10 is constructed as a unitary package in which optical elements F, P, 22, 24 are mounted with the compound lenses 22, 24 separated by $f_+-f_-$. This unitary optical package 10 is therefore suitable for manufacture and sale as a discrete optical component. This is merely illustrative, and other configurations are contemplated, such as mounting the optical components directly into a mobile device bezel (without the tubular housing 12). Various additional components may be added (e.g. optical fiber connections between components of the optical train, optical components bonded together with optical-grade light-transmissive spacers and/or adhesive (optionally thereby enabling unitary construction while omitting an exterior housing), and so forth (variants not illustrated). It is also contemplated to employ two or more instances of the optical magnification train 20 in series, possibly with different focal lengths $f_+$ and/or $f_-$ for the different instances, to obtain more complex magnification effects and/or magnification that is switchable between more than two possible magnification (i.e. zoom) levels. Still further, while the Galilean telescope topology is illustrated in FIGS. 1 and 2 and is described in greater detail the following, the optical magnification train is contemplated to employ other magnification topologies such as an astronomical telescope topology with two positive (compound) lenses separated by the sum of the focal lengths. Such alternative magnification topologies may be readily designed by the skilled artisan to provide switchable magnification levels using teachings disclosed herein including leveraging the lens sign and half-wave plate characteristics of Pancharatnam lenses incorporated into the (compound) lenses of these alternative magnification topologies to provide switchable magnification.

In the following, some illustrative examples are given of Pancharatnam lenses suitable for use as the Pancharatnam lenses 32, 34.

Pancharatnam phase optical elements provide high efficiency and can have a well-defined parabolic phase profile. See, e.g. Roux, "Geometric phase lens," J. Opt. Soc. Am. A vol. 23, pages 476-482, (2006); Marrucci et al., "Pancharatnam-Berry phase optical elements for wave front shaping in the visible domain: Switchable helical mode generation," Appl. Phys. Lett. vol. 88, page 221102 (2006); Hasman et al., "Polarization dependent focusing lens by use of quantized Pancharatnam-Berry phase diffractive optics," Appl. Phys. Lett. vol. 82, pages 328-330 (2003); Gorodetski, et al., "Optical properties of polarization-dependent geometric phase elements with partially polarized light," Opt. Commun. vol. 266, pages 365-375 (2006). In an illustrative approach, the Pancharatnam lens is suitably fabricated using a polarization holography alignment technique. See, e.g. Escuti, et al., "Simplified spectropolarimetry using reactive mesogen polarization gratings," Proc. SPIE. vol. 6302, page 630207, (2006); Escuti, and W. M. Jones, "Polarization independent switching with high contrast from a liquid crystal polarization grating," SID Sym. Dig. Tech. Papers 37, 1443-1446 (2006); Escuti et al., "Polarization independent switching with high contrast from a liquid crystal polarization grating," SID Sym. Dig. Tech. Papers vol. 37, pages 1443-1446 (2006); Crawford, et al., "Liquid-crystal diffraction gratings using polarization holography alignment techniques," J. Appl. Phys. vol. 98, page 123102 (2005). In one specific approach, an alignment layer is patterned using a holographic exposure, followed by spin-on deposition of a liquid crystal material followed by polymerization in order to generate a half-wave plate having the Pancharatnam phase pattern. A Pancharatnam lens is compact, with the thickness typically being controlled by the thickness of substrate on which the thin active layer (~1.5 μm) is coated. The active layer of a Pancharatnam lens typically comprises a continuous spiraling structure of the optic axis of a half wave retardation film. Advantageously, the Pancharatnam lens does not require greater thickness in order to achieve larger aperture size.

With reference back to FIG. 1, and more particularly to the upper left inset which shows a plan view of the Pancharatnam lens 32 or the Pancharatnam lens 34 (the two lenses 32, 34 are identical in the illustrative embodiment), the Pancharatnam lens is a half-wave retarder (i.e. half-wave plate) that has its optic axis in the plane of the film, with the azimuthal angle ($\beta$). The angle $\beta$ of the optic axis is spatially varying, such that the angle is proportional to the square of the radial position (r) as shown in FIG. 1, upper left inset. Circularly polarized light entering the Pancharatnam lens exits as circularly polarized light with the opposite sign (for any location r). The device acts as a lens because the relative phase of the exiting circularly polarized light between two different r values is:

$$2\beta(r_1)-2\beta(r_2)=2\beta(r_1)\cdot(1-(r_2-r_1)^2) \quad (1)$$

See Honma et al., "Liquid-Crystal Fresnel Zone Plate Fabricated by Microrubbing," Jpn. J. Appl. Phys. vol. 44, pages 287-290 (2005). As already discussed, a Pancharatnam lens changes its sign (switches from a positive lens to a negative lens) when the handedness (i.e. sign) of circularly polarized input light changes. Additionally, the lens is a half-wave plate, so the handedness of the light changes sign after passing through the Pancharatnam lens.

The disclosed compact non-mechanical zoom lens designs disclosed herein are based on Pancharatnam phase lens, and the illustrative embodiment includes an optical magnification train 20 having a Galilean telescope configuration which combines a positive (i.e. converging) lens and a negative (i.e. diverging) lens. In the Galilean telescope topology, the positive (converging) lens serves as an objective lens, and the negative (diverging) lens serves as an eyepiece. In the optical magnification train 20, these two lenses can be interchanged through a non-mechanical means (operating the bias source 16 in illustrative FIG. 1) as further explained in the following. This allows the magnification of the zoom system 10 to be switchable between greater than one and less than one to realize the function of zooming in/out.

The layout of the optical magnification train 20 of FIGS. 1 and 2 includes the pair of identical composite lens 22, 24 with each composite lens including the polarization independent lens 42, 44 (which may, by way of illustration, be a conventional lens made of glass or another transparent material with a suitable refractive index), and the polarization controlled Pancharatnam lens 32, 34. The two composite lenses 22, 24 are switchable between being a positive lens with a focal length of $f_+$ and a negative lens with a focal length of $-f_-$ (where $f_-$ is a positive value, i.e. the magnitude of the focal length of the negative lens). The distance between the two composite lenses 22, 24 is $f_+-f_-$.

With particular reference to FIG. 2, in State 1 (top diagram) the left composite lens 22 is a positive lens with the focal length $f_+$ and the right composite lens 24 is a negative lens with the focal length of $-f_-$. In State 2 (bottom diagram) the left composite lens 22 is a negative lens with the focal length $-f_-$ and the right composite lens 24 is a positive lens with the focal length of $f_+$. Switching between State 1 and State 2 is accomplished by changing the sign of the circularly polarized light ($L_{pol}$) entering the first composite lens 22. This sign (i.e. handedness) change is suitably obtained using the polarization element or sub-system P (see FIG. 1), which by way of example may comprise a circular polarizer at the input of the lens, followed by a switchable liquid crystal half-wave plate which can switch between having no retardation and having a half-wave retardation. Again, the order of the circular polarizer and the half-wave plate may be reversed, and/or various components of the polarization element or sub-system P may be located elsewhere along the optical train than where shown in FIG. 1, or other configurations can be used). Advantageously, the second Pancharatnam lens 34 in the second composite lens 24 "automatically" has the appropriate opposite sign because light exiting the first Pancharatnam lens 32 has the opposite circular polarization as the input light ($L_{pol}$) due to the half-wave plate property of Pancharatnam lenses.

With continuing reference to FIG. 2, the magnitude of zoom lens magnification in State 1 is $M_1=f_+/f_-$ and the magnification in State 2 is $M_2=f_-/f_+$ and so $M_1=1/M_2$. Therefore, the zoom ratio (Z) of the optical magnification train 20 is $$Z = \frac{M_1}{M_2} = M_1^2.$$

Next, a suitable configuration of composite lenses 22, 24 to obtain the desired switchable focal lengths $f_+$ and $-f_-$ is considered. As the two composite lenses 22, 24 are identical in the embodiment of FIGS. 1 and 2, the following is described for the first composite lens 22, and is equally applicable to the second composite lens 24. Denote the magnitude of the focal length of the polarization-independent lens 42 as focal length $f_g$. This is a negative lens, so the polarization-independent lens 42 has focal length $-f_g$. Further denote the magnitude of the focal length of the Pancharatnam lens 32 as $f_{pan}$. The Pancharatnam lens 32 can be switched between being a positive lens with focal length $f_{pan}$ and a negative lens with focal length $-f_{pan}$ by switching the handedness of the circularly polarized input light.

In general, the combined focal length f of a composite lens comprising two lenses with focal lengths $f_1$, $f_2$ is given (under the thin lens approximation) as $$\frac{1}{f} = \frac{1}{f_1} + \frac{1}{f_2} \rightarrow f = \frac{f_1 f_2}{f_1 + f_2}.$$

Applying this for the focal lengths $-f_g$ and $f_{pan}$ (where the Pancharatnam lens 32 is operating here as a positive lens, i.e. State 1 shown in FIG. 2 top diagram) yields the positive focal length $f_+$ for the Galilean telescope topology:

$$f_+ = \frac{(-f_g)(f_{pan})}{-f_g + f_{pan}} = \frac{f_g f_{pan}}{f_g - f_{pan}} \quad (2)$$

Similarly, applying $$\frac{1}{f} = \frac{1}{f_1} + \frac{1}{f_2} \rightarrow f = \frac{f_1 f_2}{f_1 + f_2}$$

for the focal lengths $-f_g$ and $-f_{pan}$ (where the Pancharatnam lens 32 is operating here as a negative lens, i.e. State 2 shown in FIG. 2 bottom diagram) yields the negative focal length $-f_-$ for the Galilean telescope topology:

$$-f_- = \frac{(-f_g)(-f_{pan})}{-f_g + (-f_{pan})} = \frac{-f_g f_{pan}}{f_g + f_{pan}} \rightarrow f_- = \frac{f_g f_{pan}}{f_g + f_{pan}} \quad (3)$$

The action required to change the focal length of the first composite lens 22 is to change the handedness of the input circularly polarized light ($L_{pol}$), which is equal to the effect of changing the sign of the focal length of the Pancharatnam lens. This also automatically changes the focal length of the second composite lens 24 to the opposite sign from that of the first composite lens 22 due to the half-wave plate property of the first Pancharatnam lens 32.

The magnification $M_1 = f_+/f_-$ in State 1 can then be written as:

$$M_1 = \frac{f_+}{f_-} = \frac{f_g f_{pan}}{f_g - f_{pan}} \times \frac{f_g + f_{pan}}{f_g f_{pan}} = \frac{f_g + f_{pan}}{f_g - f_{pan}} \quad (4)$$

and the magnification $M_2 = 1/M_1$ can be written as:

$$M_2 = \frac{f_g - f_{pan}}{f_g + f_{pan}} \quad (5)$$

Combining Expressions (2), (3), and (4) and the relationship of the zoom ratio Z to the magnification $M_1$, i.e. $Z = M_1^2$, provides a measure of the distance $(f_+ - f_-)$ that limits the zoom lens as:

$$(f_+ - f_-) = \left(\frac{Z-1}{2\sqrt{Z}}\right) f_{pan} \quad (6)$$

Expression (6) shows that a reduced focal length $f_{pan}$ for the Pancharatnam lenses 32, 34 enables the overall length $(f_+ - f_-)$ of the optical magnification train 20 to be reduced. An advantage of a Pancharatnam lens is that it is capable of having a large diameter while at the same time having a short focal length. Pancharatnam lenses can be designed with the ratio of the focal length to the diameter (known as the "f-number, or f #") being less than or equal to 2. In other words, $$\frac{f_{pan}}{D} \le 2$$

where D is the diameter of the Pancharatnam lens. Writing this inequality as $f_{pan} \le 2D$ and inserting into Expression (6) yields a design constraint:

$$(f_+ - f_-) \le \left(\frac{Z-1}{\sqrt{Z}}\right) D \quad (7)$$

for the achievable case in which the f-number of the Pancharatnam lens is less than or equal to 2. By way of a numeric example, consider the case of a value of a design basis zoom ratio of Z=4 and a design aperture defined by a diameter D=4 mm for the Pancharatnam lenses 32, 34. Putting these values into Expression (7) yields $$(f_+ - f_-) \le \left(\frac{4-1}{\sqrt{4}}\right)$$

(4 mm) so that $(f_+ - f_-) \le 6$ mm. As another numeric example, if the design parameters are zoom ratio Z=10 and aperture (mainly controlled by Pancharatnam lens diameter) D=1.5 mm, then Expression (6) yields $$(f_+ - f_-) \le \left(\frac{10-1}{\sqrt{10}}\right)$$

(1.5 mm) so that $(f_+ - f_-) \le 4.3$ mm. By comparison, a switchable zoom apparatus with an optical magnification train that employs conventional electro-optic liquid crystal lenses typically requires an optical magnification train of length 10 centimeters or longer.

To provide further illustration, a particular design is considered, in which the State 1 design-basis magnification is $M_1 = 2$. From Expression (4) it can be seen that this magnification is obtained for $f_g = 3 f_{pan}$. Designating the length of the optical magnification train 20 as $L_{zoom}$, it follows from Expressions (2) and (3) that for the design basis $M_1 = 2$:

$$L_{zoom} = f_+ - f_- = \frac{f_g f_{pan}}{f_g - f_{pan}} - \frac{f_g f_{pan}}{f_g + f_{pan}} = \frac{(3 f_{pan})(f_{pan})}{3 f_{pan} + f_{pan}} = \frac{3 f_{pan}}{4} \quad (8)$$

To provide a numerical example, further assume that the Pancharatnam lenses 32, 34 each have focal length $f_{pan} = 8.5$ mm, and select the polarization-independent lenses 42, 44 to have focal length magnitude $f_g = 25$ mm about three times this value (approximately satisfying $f_g=3f_{pan}$ to yield $M_1=2$). For these values, $f_+=12.9$ mm and $f_-=6.34$ mm, and the lens separation is therefore $f_+-f_-=6.56$ mm. It will be appreciated that a quarter-wave or half-wave plate could be formed with a thin film of a few microns thickness (with suitable electrodes for electrical switching) and a polarizer can also be constructed with a thin film configuration—thus, this example corresponds to an electrically switchable zoom apparatus with zoom ratio $M_1^2=4$ having a total thickness of well under 1 cm. More generally, the optical magnification train 20 may in some embodiments have a total thickness of less than or equal to 1.0 cm, and more preferably less than or equal to 5.0 mm, in combination with an f-number of 2.0 or lower. This low profile design is achievable, in part, because the Pancharatnam lenses 32, 34 can be made thin, as the requisite thickness of the Pancharatnam lens does not increase with increasing aperture size. Additionally, the composite lenses 22, 24 can be constructed as unitary compound lenses in which the polarization-independent lens 42, 44 serves as one support substrate for the corresponding Pancharatnam lens layer. The thickness of the complete zoom apparatus 10 can be comparable, e.g. less than or equal to 1.0 cm, and more preferably less than or equal to 5.0 mm, because the ancillary (optional) spectral filtering F and polarization P components can be made thin. For example, the thickness of the active layer of a quarter- or half-wave plate is on the order of the wavelength of light in the material, or less, e.g. on the order of one micron or less for wavelengths in the visible spectrum. Moreover, these components F, P typically do not impact the f-number of the system, so that the f-number of the zoom apparatus 10 is controlled by the f-number of the optical magnification train 20.

Figure 3:
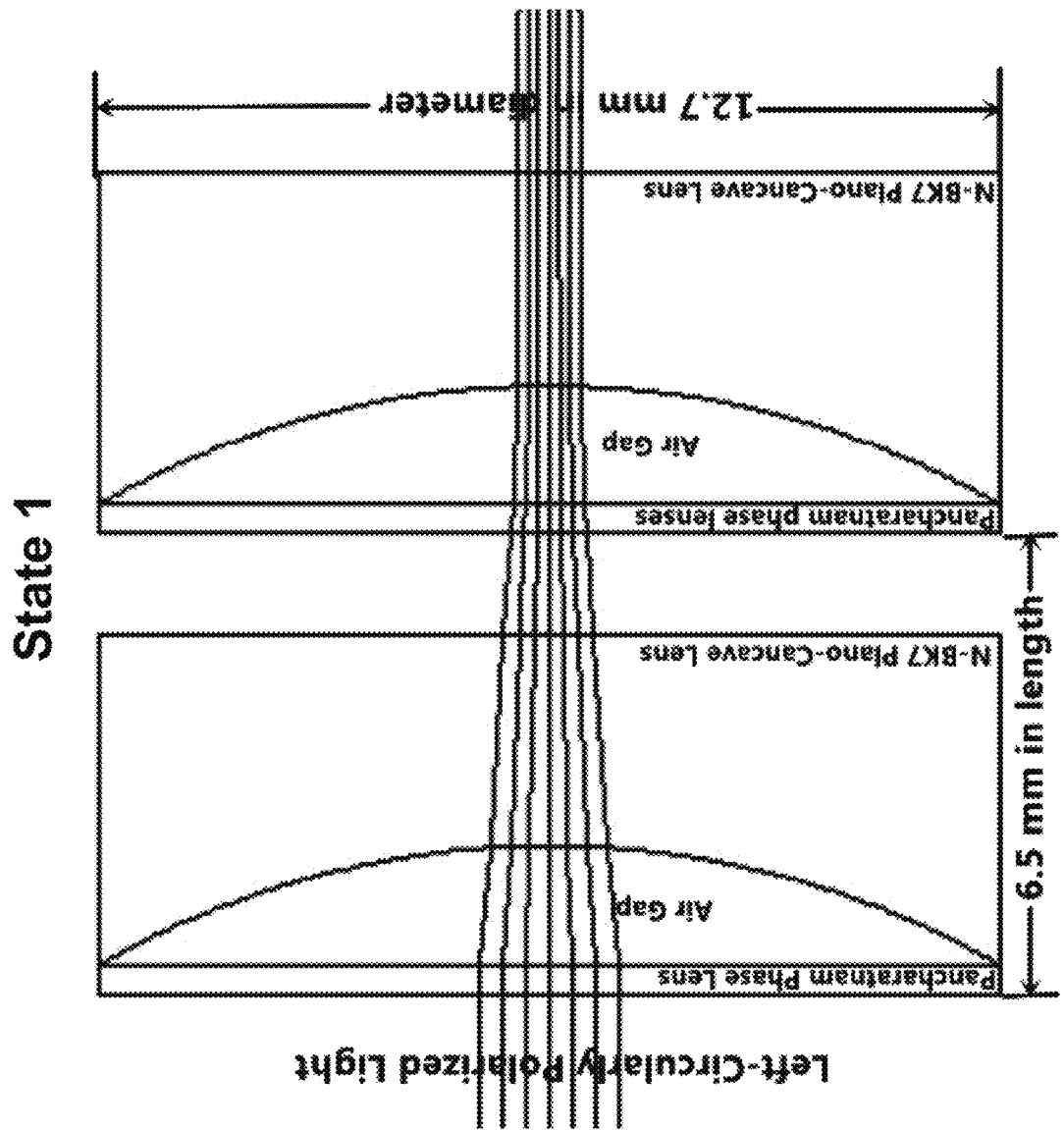
FIGS. 3 and 4 diagrammatically show ray trace diagrams for State 1 (FIG. 3) and State 2 (FIG. 4) of a simulated embodiment of the non-mechanical optical zoom package of FIGS. 1 and 2.
Figure 4:
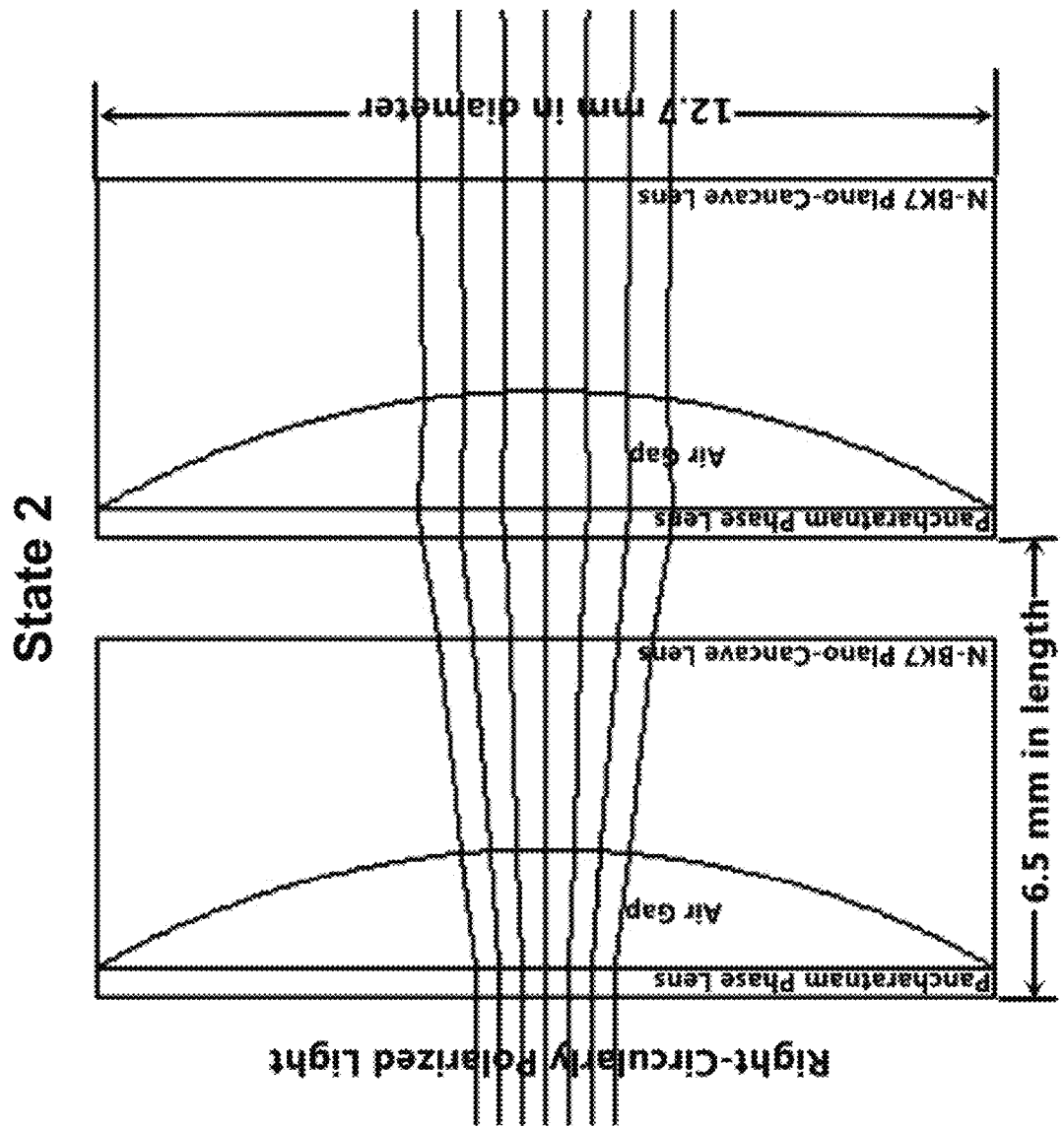

With reference to FIGS. 3 and 4, the foregoing numerical example was simulated using the Zemax™ optical design package (available from Zemax LLC, Redmond, Wash., USA). In the simulation, the Pancharatnam lenses 32, 34 were simulated as gradient index lenses, each simulated as directly coupled with an N-BK7 plano-concave lens serving as the lens 42, 44. The distance between the two composite lenses 22, 24 was simulated as 6.5 mm. FIG. 3 shows a ray trace diagram produced by the simulation of the system in State 1, where the input light ($L_{pol}$) was assumed to be of the polarization state to cause the left Pancharatnam lens 32 to be a positive lens and the right Pancharatnam lens 34 to be a negative lens. FIG. 4 analogously shows a ray trace diagram produced by the simulation of the system in State 2.

A zoom apparatus with an optical magnification train conforming with the optical magnification train 20 described with reference to FIGS. 1 and 2 was actually constructed, and is described in the following.

Figure 5:
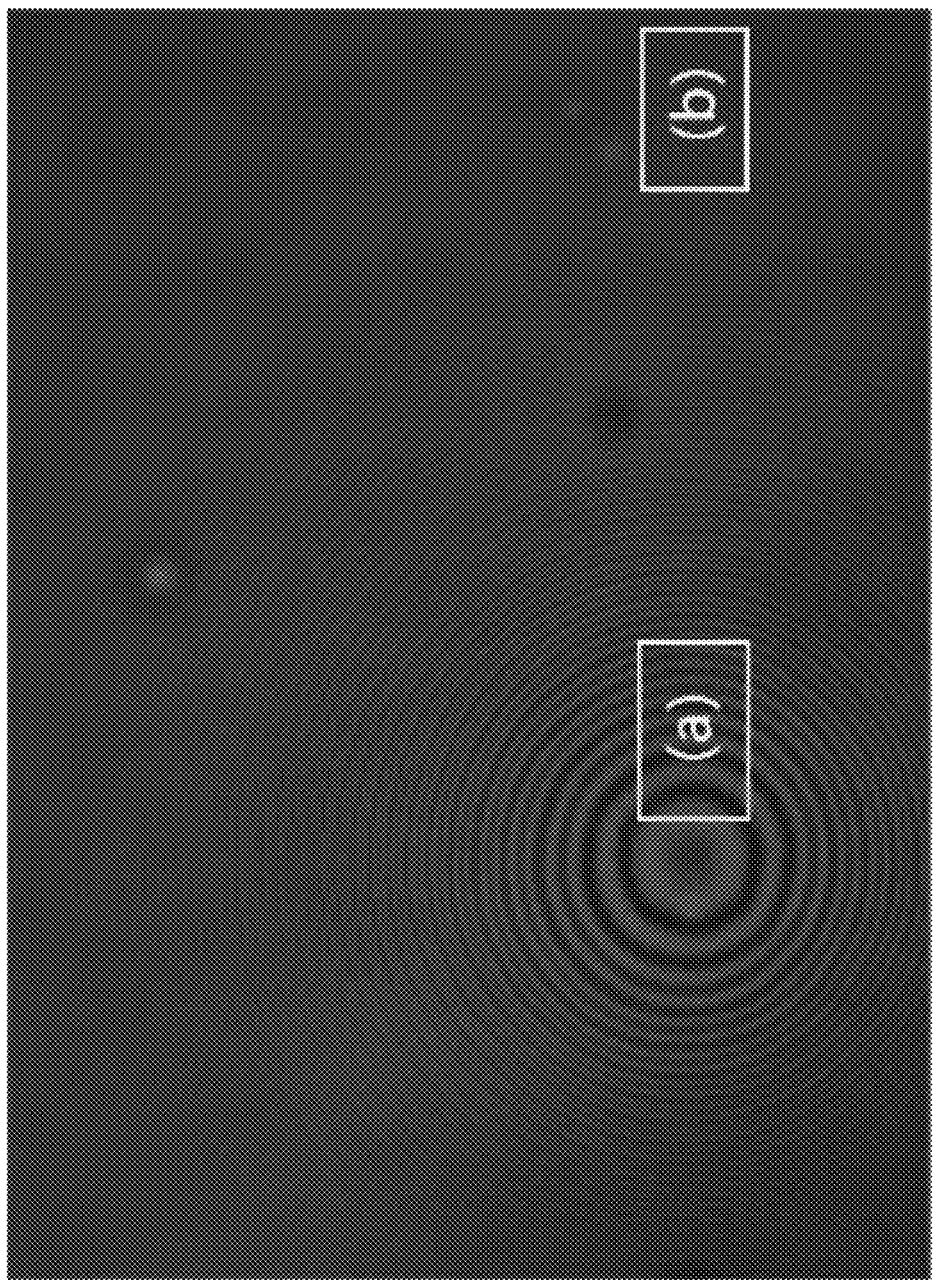
FIG. 5 shows a polarized microscope image of a Pancharatnam lens as described herein.
Figure 5A:
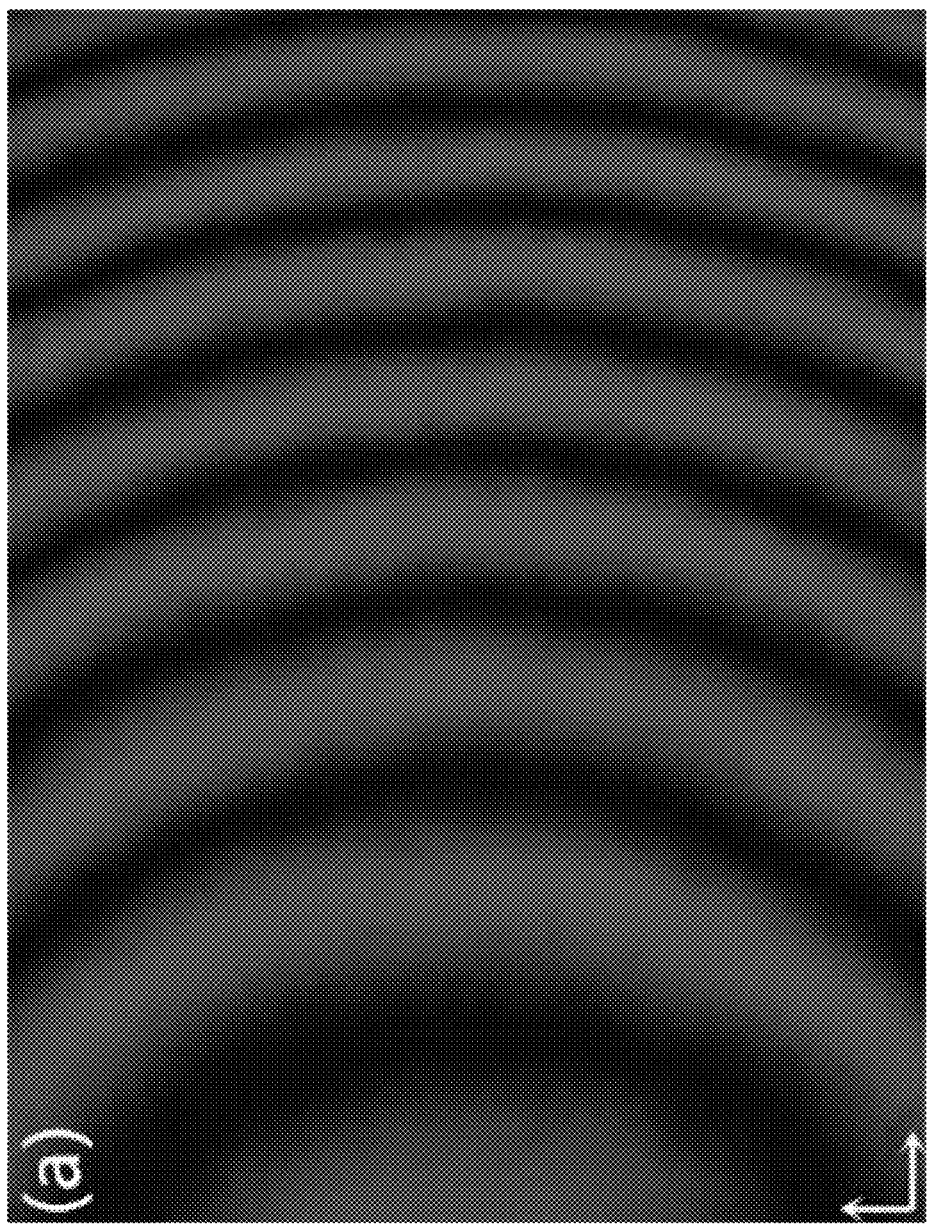
FIGS. 5(a) and 5(b) show magnified regions of region (a) and region (b), respectively.
Figure 5B:
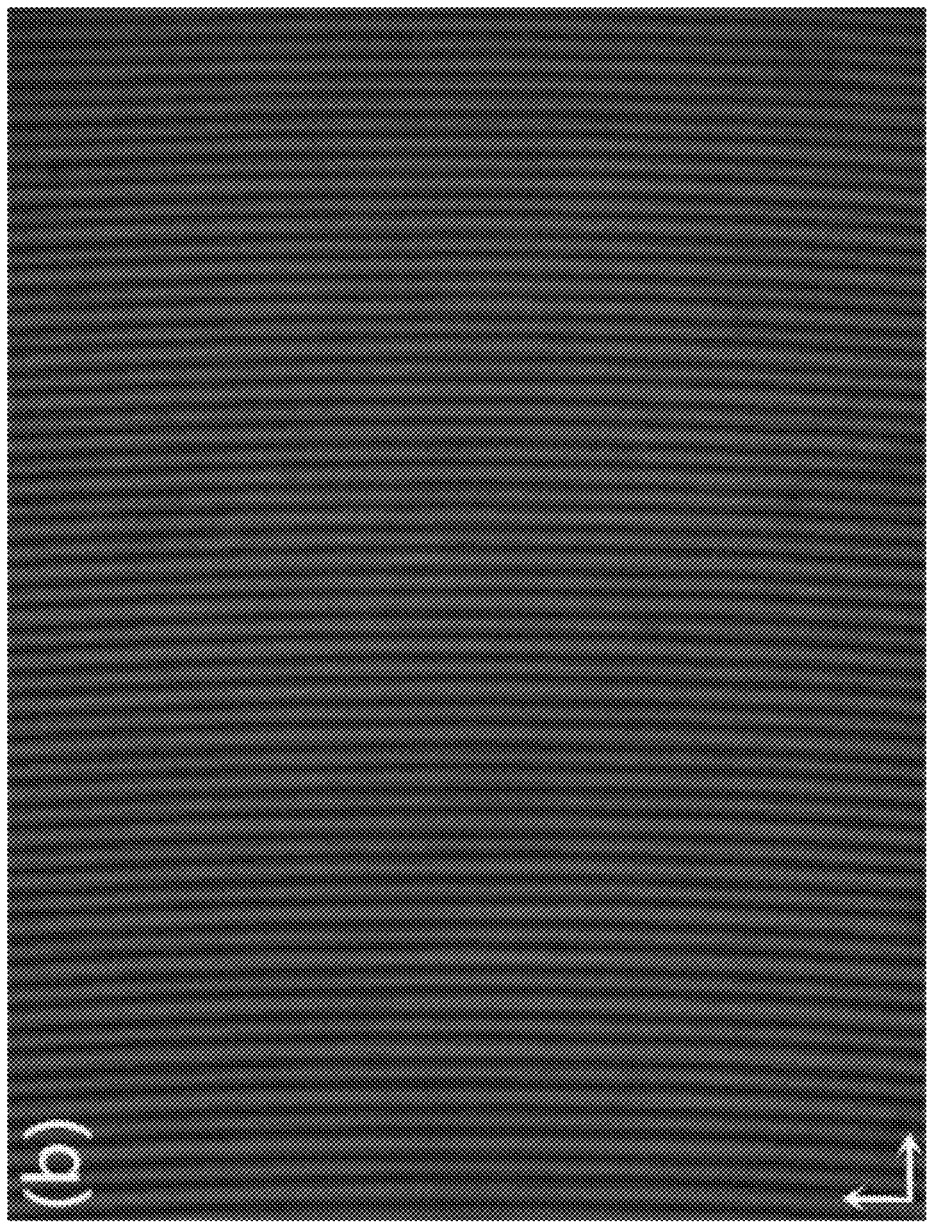

With reference to FIGS. 5, 5(a), and 5(b), microscope images are presented of a single Pancharatnam lens of the type used in the actually constructed zoom apparatus. The imaged Pancharatnam lens has the thickness of half-wave plate at the 633 nm wavelength. FIG. 5 shows an "overview" microscope image, FIG. 5(a) shows a magnified image around the center of the lens (marked as region "(a)" in FIG. 5), and FIG. 5(b) shows a magnified image close to the edge of the lens (marked as region "(b)" in FIG. 5). These microscope images were taken between crossed polarizers with a red color filter. The black rings correspond to the regions where the spiraling optics axis is aligned with the polarizer or analyzer. Therefore, the director angle β changes by 90 degrees between each dark ring. One pitch, meaning the director angle changes by 180 degrees, was measured to be about 2.2 μm in the edge area, which satisfies with the initial design. This Pancharatnam lens has a diameter of 5 mm and a focal length of 8.5 mm, which is the same parameters as were used in the simulation described with reference to FIGS. 3 and 4.

Based on the Zemax™ simulation described with reference to FIGS. 3 and 4, a zoom apparatus including the optical magnification train 20 of FIGS. 1 and 2 was constructed, using two Pancharatnam lenses of the type imaged in FIGS. 5, 5(a), and 5(b) as the Pancharatnam lenses 32, 34 and two commercial N-BK7 plano-concave lenses as the polarization independent lenses 42, 44. Tests performed using this actually constructed zoom apparatus are reported in the following.

Figure 6A:
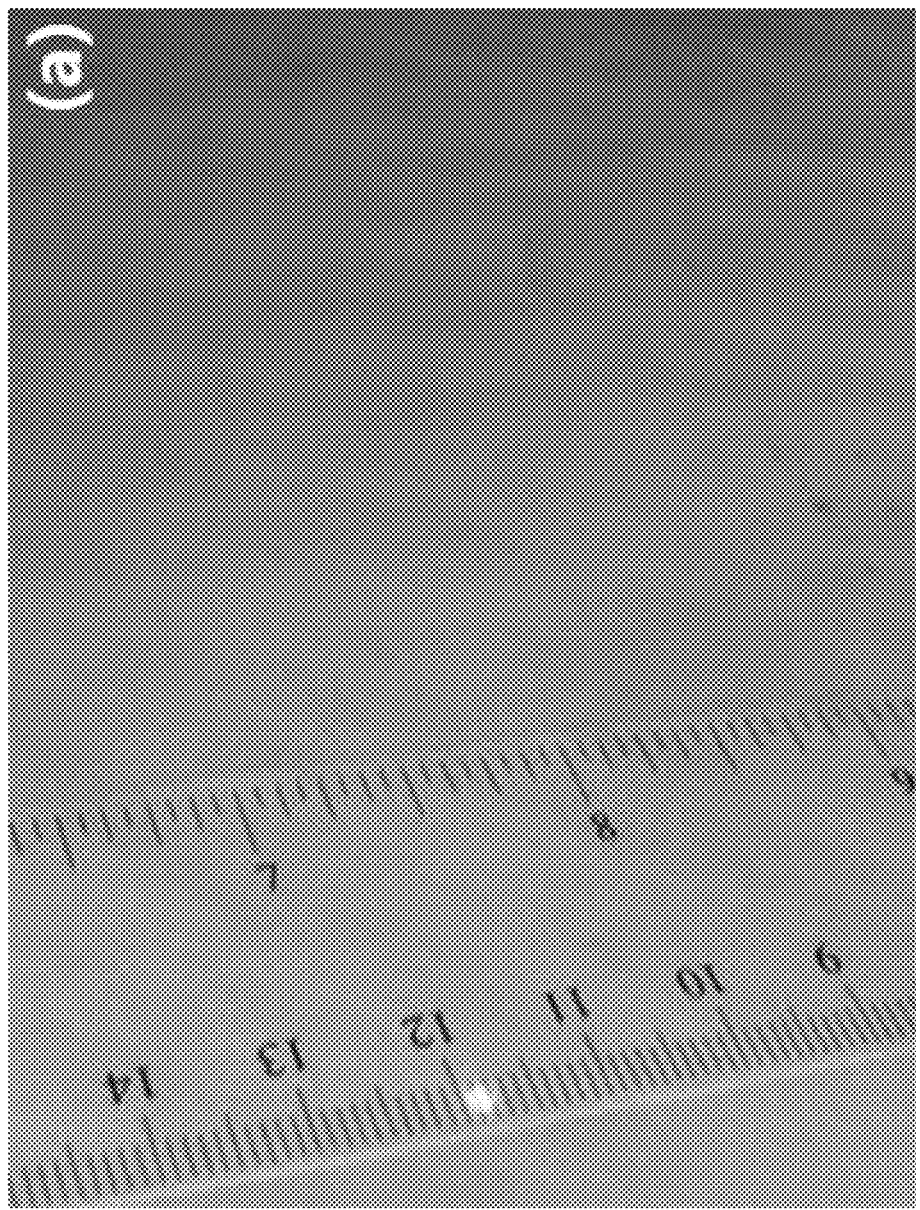
FIGS. 6(a), 6(b), and 6(c) illustrate an application of the optical zoom package of FIGS. 1 and 2 as an adjustable laser beam expander as described herein.
Figure 6B:
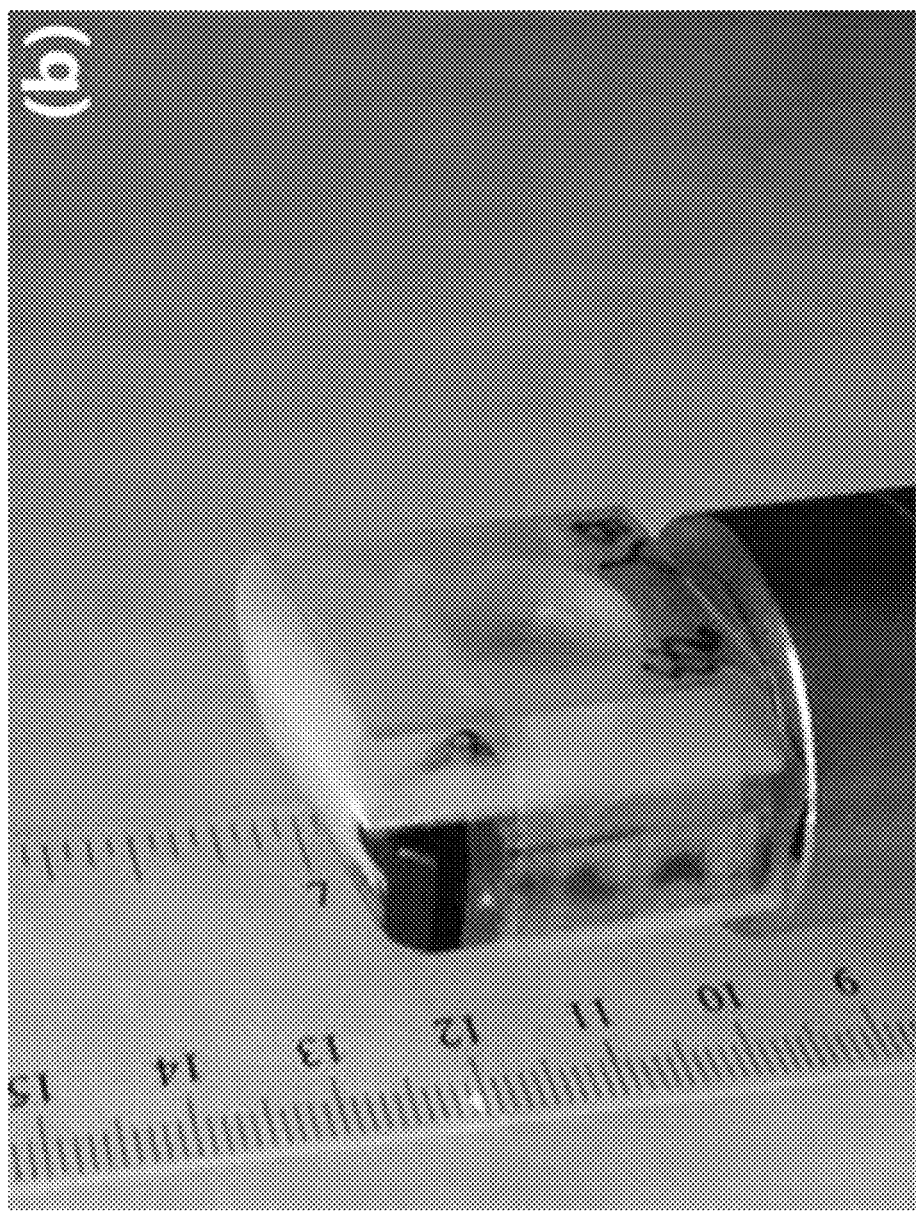
Figure 6C:
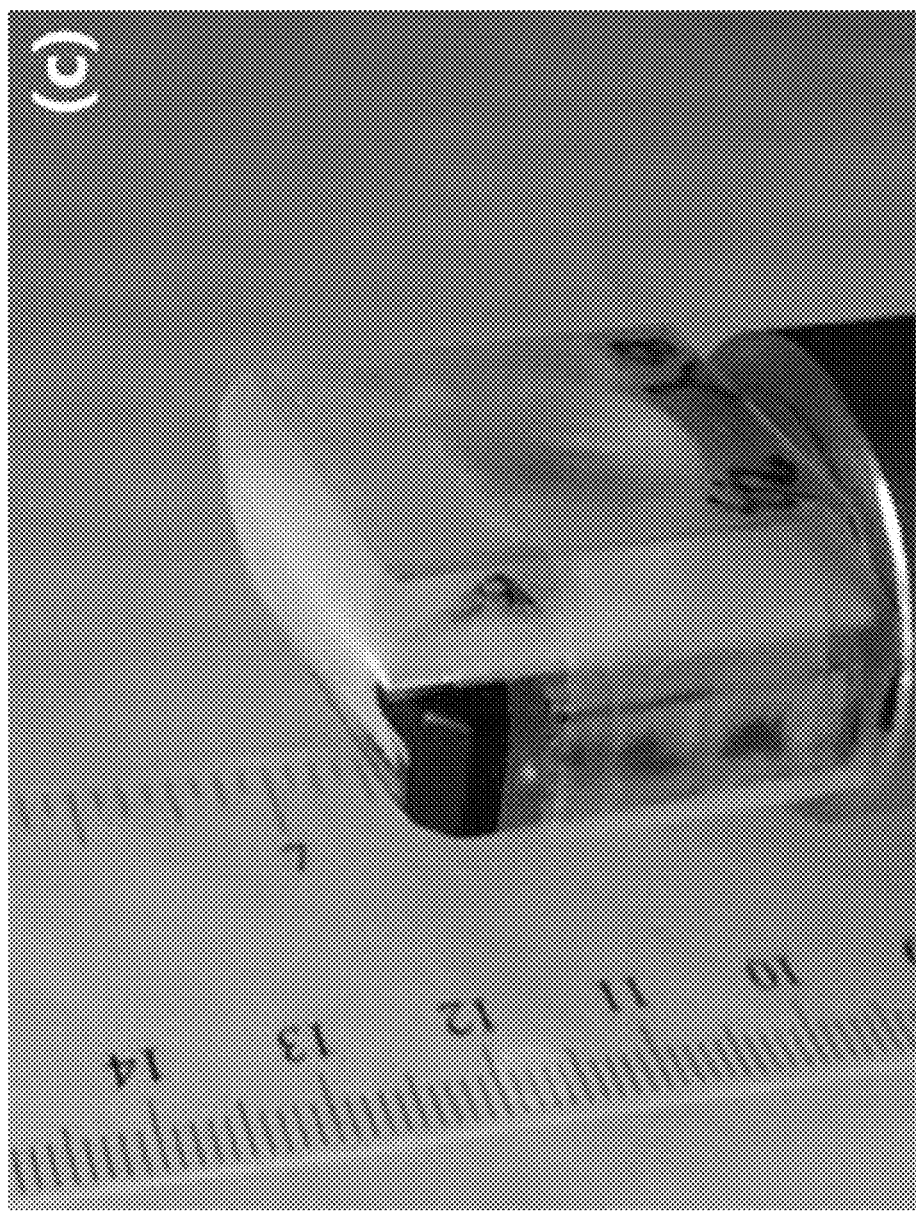

With reference to FIGS. 6(a), 6(b), and 6(c), the zooming function of the actually constructed zoom apparatus was tested using a red laser beam having a 2 mm diameter. This was a test of the use of the zoom apparatus as a beam expander device with value −2 in State 1 and value +2 in State 2. In the tests photographed in FIGS. 6(a), 6(b), and 6(c), a laser was incident from right side of each photograph. FIG. 6(a) shows the input beam with −2 mm diameter without using the zoom lens. In other words, FIG. 6(a) shows the unaltered laser beam. FIG. 6(b) shows the output laser beam spot reduced to about 1 mm in diameter using the zoom apparatus in State 1. FIG. 6(c) shows the output laser beam spot expanded to about 4 mm in diameter using the zoom apparatus in State 2.

Figure 7A:
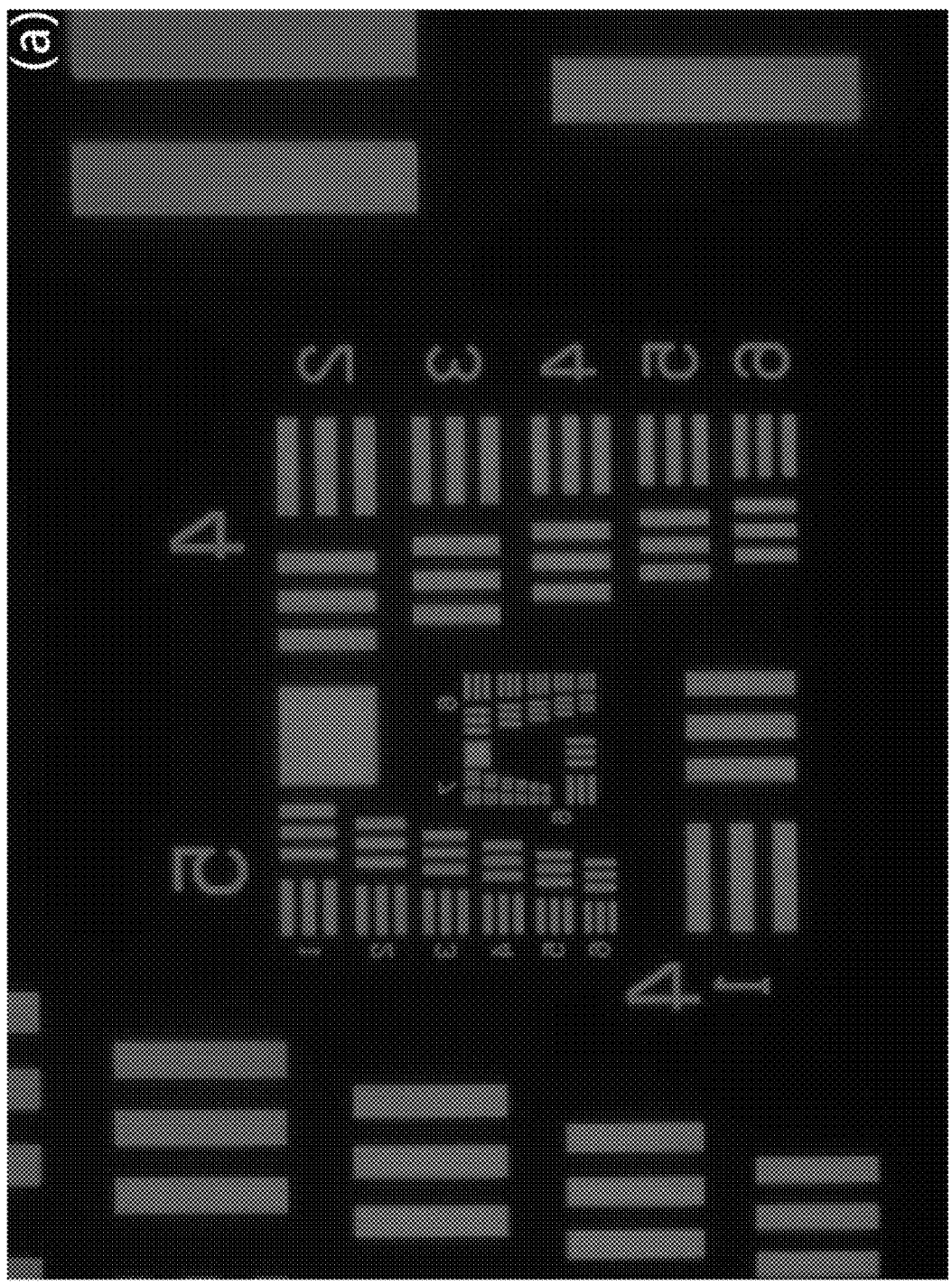
FIGS. 7(a), 7(b), and 7(c) illustrate an application of the optical zoom package of FIGS. 1 and 2 as an optical camera zoom system as described herein.
Figure 7B:
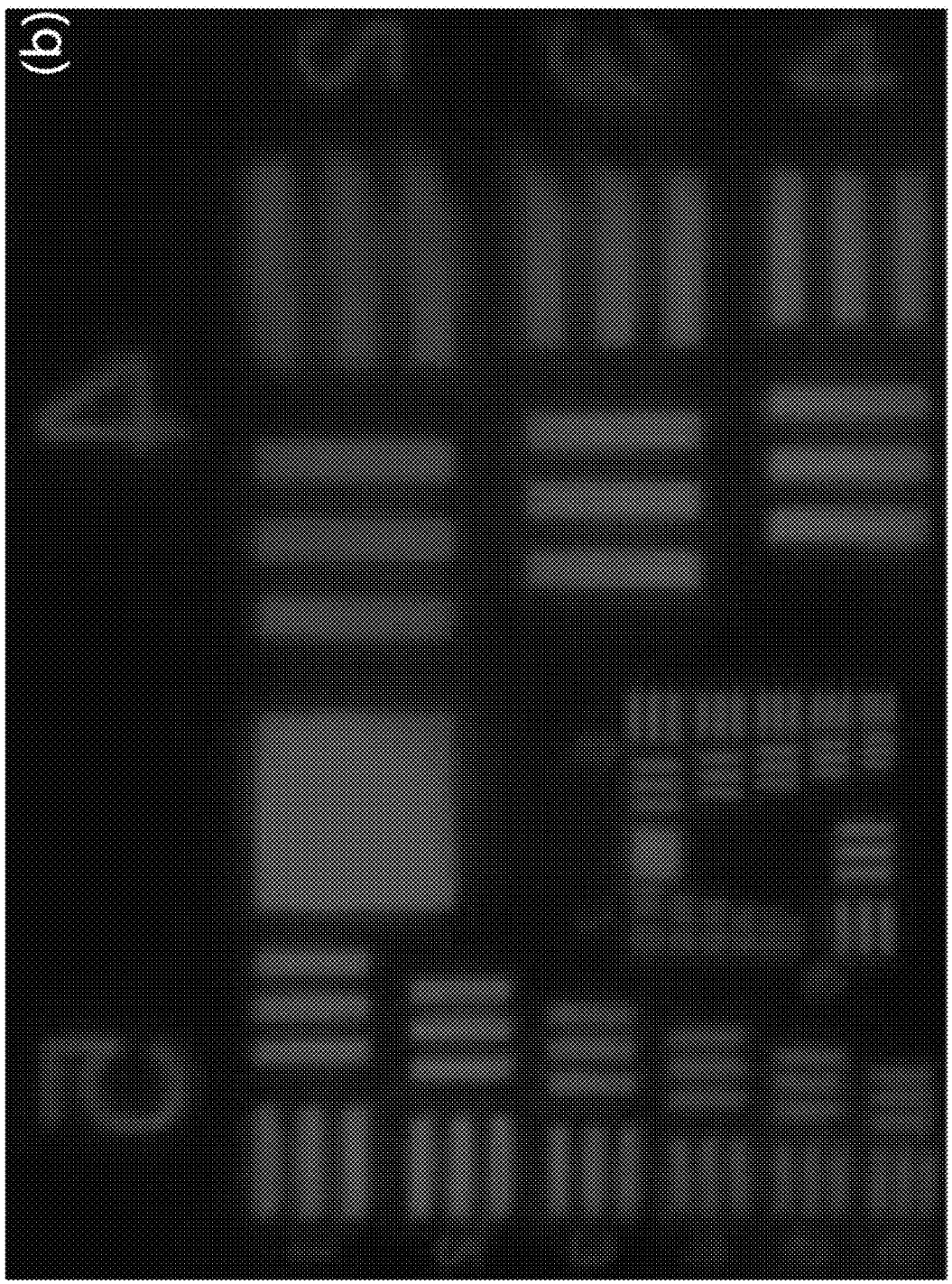
Figure 7C:
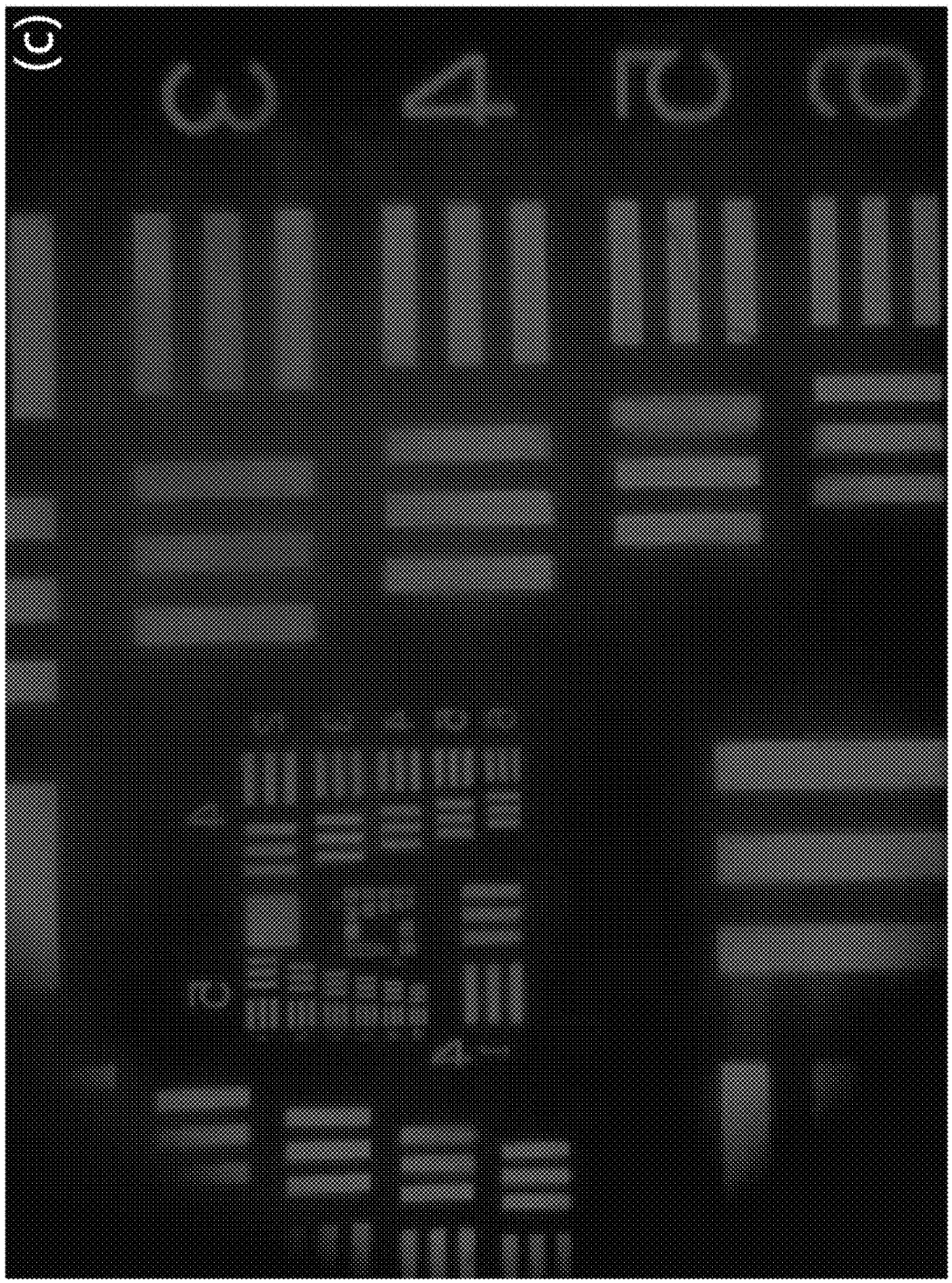

With reference to FIGS. 7(a), 7(b), and 7(c), images are shown of a test object (1951 USAF test chart) acquired: without using the zoom apparatus (FIG. 7(a)); with the zoom apparatus using left circular polarized light to obtain State 1 (FIG. 7(b)); and with the zoom apparatus using right circular polarized light to obtain State 2 (FIG. 7(c)). These experiments tested the image quality and zoom ratio of the actually constructed zoom apparatus device by using the 1951 USAF test chart under a microscope with the same objective lens (FIG. 7(a)). The center area of test chart is observed through the lens with the red illumination light having opposite states of circular polarization as photographed in FIGS. 7(b) and 7(c), respectively. The magnitude of zoom lens magnification in State 1 (FIG. 7(b)) is about 2×, while the magnitude of zoom lens magnification in State 2 (FIG. 7(c)) is about 0.5×. Therefore, the zoom ratio Z is $$\frac{M_1}{M_2} \sim 4$$

as designed.

With reference back to FIG. 1, it is again emphasized that the optical magnification train 20 is an entirely static (i.e. passive) system. There are no moving parts, and no electrical inputs for applying an electrical bias to the optical magnification train 20. Rather, optical zoom switching is achieved by reversing handedness of the circularly polarized input light ($L_{pol}$), which in the illustrative example is done by switching the polarization element or sub-system P using the electrical bias source 16. Other components or approaches for providing circularly polarized input light with reversible handedness may alternatively be used. Moreover, while the illustrative Galilean telescope configuration for the optical magnification train 20 advantageously provides a low profile zoom apparatus due to the small composite lens separation ($f_+-f_-$), other magnification train topologies are contemplated, such as an astronomical telescope configuration. Additionally or alternatively, it is contemplated to place two or more such magnification trains in series to obtain more obtainable switching states (i.e. more than two zoom settings) or to achieve other optical benefits that are conventionally obtainable by combining magnification systems.

In the illustrative embodiments, the first Pancharatnam lens 32 and the first polarization independent lens 42 are secured together to form a (first) compound lens unit defining the first composite lens 22, and similarly the second Pancharatnam lens 34 and second polarization independent lens 44 are secured together to form a (second) compound lens unit defining the composite lens 24. In variant embodiments, the composite lens 22 may have its constituent lenses 32, 42 spaced apart from one another, and likewise the composite lens 24 may have its constituent lenses 34, 44 spaced apart from one another. In such embodiments, the thin lens approximation likely will not apply to the composite lenses, but numerical analysis using optical ray tracing software or the like can be used to optimize the positioning of the constituent Pancharatnam and polarization-independent lenses to achieve switchable zoom in accordance with a particular optical design objective.

As a further variant, the polarization independent lenses 42, 44 may themselves be constructed as compound lenses, or may comprise two or more lenses cooperatively providing the desired focal length. As previously mentioned, these lenses in general do not need to be negative lenses, and for example in an astronomical telescope magnification train configuration these lenses may be replaced by positive polarization-independent lenses.

As a further variant, it is contemplated to replace the illustrative static Pancharatnam lenses 32, 34 and/or the static polarization-independent lenses 42, 44 with electro-optic lenses so as to be able to adjust focal length $f_{pan}$ and/or the focal length $f_g$, respectively. The skilled artisan can readily leverage such a modification, in combination with the consequent composite lens focal lengths of Expressions (2) and (3), in order to (for example) design a switchable non-mechanical zoom apparatus having two switching states, but for which the specific zoom settings of one or both of those states is adjustable by adjusting the bias on the electro-optic lenses.

The disclosed optical magnification train 20 or variants as described herein or equivalents thereof may find application in any optical system that beneficially incorporates an electrically switchable, non-mechanical zoom apparatus. The disclosed optical magnification trains may be used in imaging systems to provide switchable objective focal length, in beam expander systems to provide adjustable beam expansion, and so forth.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. A zoom system comprising:
an optical magnification system including:
a first composite lens comprising a first Pancharatnam lens and a first polarization-independent lens; and
a second composite lens comprising a second Pancharatnam lens and a second polarization-independent lens;
wherein the first composite lens is arranged to output light into the second composite lens; and
an electro optic polarization element or sub-system configured to input circularly polarized light to the first composite lens of the optical magnification system;
wherein the electro optic polarization element or sub-system is configured to electrically switch the circularly polarized light between left-handedness and right-handedness.

2. The zoom system of claim 1 wherein the first composite lens and the second composite lens are identical lenses.

3. The zoom system of claim 1 wherein:
the first composite lens has a positive focal length $f_+$ for circularly polarized light of a first handedness and a negative focal length of magnitude $f_-$ for circularly polarized light of a second handedness opposite the first handedness; and
the second composite lens has the positive focal length $f_+$ for circularly polarized light of the first handedness and the negative focal length of magnitude $f_-$ for circularly polarized light of the second handedness.

4. The zoom system of claim 3 wherein the first and second composite lenses are spaced apart by a distance $f_+-f_-$.

5. The zoom system of claim 1 wherein the optical magnification system is a static system that does not include any electrical or mechanical inputs.

6. The zoom system of claim 1 wherein the optical magnification system has a total thickness of 1.0 cm or less and has an f-number of 2 or lower.

7. The zoom system of claim 1 wherein the optical magnification system has a total thickness of 5.0 mm or less and has an f-number of 2 or lower.

8. The zoom system of claim 1 further comprising:
a spectral bandpass filter.

9. An optical magnification system comprising:
a first lens having a positive focal length $f_+$ for circularly polarized light of a first handedness and a negative focal length of magnitude $f_-$ for circularly polarized light of a second handedness opposite the first handedness; and
a second lens having a positive focal length $f_+$ for circularly polarized light of the first handedness and a negative focal length of magnitude $f_-$ for circularly polarized light of the second handedness;
wherein the first lens is arranged to output into the second lens and the first and second lenses are spaced apart by a distance $f_+-f_-$.

10. The optical magnification system of claim 9 wherein:
the first lens includes a Pancharatnam lens; and
the second lens includes a Pancharatnam lens.

11. The optical magnification system of claim 10 wherein:
the first lens is a composite lens including at least one additional lens in addition to the Pancharatnam lens; and
the second lens is a composite lens including at least one additional lens in addition to the Pancharatnam lens.

12. The optical magnification system of claim 9 wherein the optical magnification system has no moving parts.

13. The optical magnification system of claim 9 wherein the optical magnification system has no electrical inputs for applying an electrical bias to the optical magnification train.

14. An optical magnification system comprising:
a first lens having a positive focal length $f_+$ for circularly polarized light of a first handedness and a negative focal length of magnitude $f_-$ for circularly polarized light of a second handedness opposite the first handedness, the first lens including a Pancharatnam lens having focal length of magnitude $f_{pan}$; and
a second lens having a positive focal length $f_+$ for circularly polarized light of the first handedness and a negative focal length of magnitude $f_-$ for circularly polarized light of the second handedness, the second lens including a Pancharatnam lens having focal length of magnitude $f_{pan}$;

wherein the first lens further includes a polarization-independent lens having negative focal length of magnitude $f_g$; and wherein the second lens further includes a polarization-independent lens having negative focal length of magnitude $f_9$.

15. The optical magnification system of claim 14 wherein:

the first lens is a composite lens in which the Pancharatnam lens and the polarization-independent lens are bonded together;

the second lens is a composite lens in which the Pancharatnam lens and the polarization-independent lens are bonded together; and $$f_+ = \frac{f_g f_{pan}}{f_g - f_{pan}} \text{ and } f_- = \frac{f_g f_{pan}}{f_g f_{pan}}.$$

16. A zoom apparatus comprising:

an optical magnification system including:

a first lens having a positive focal length $f_+$ for circularly polarized light of a first handedness and a negative focal length of magnitude $f_-$ for circularly polarized light of a second handedness opposite the first handedness, and a second lens having a positive focal length $f_+$ for circularly polarized light of the first handedness and a negative focal length of magnitude $f_-$ for circularly polarized light of the second handedness, wherein the first lens is arranged to output into the second lens; and an electro-optic polarization element or sub-system configured to input circularly polarized light to the first lens of the optical magnification system;

wherein the electro-optic polarization element or sub-system is configured to electrically switch the circularly polarized light between left-handedness and right-handedness.

17. The zoom apparatus of claim 16 further comprising:

a spectral bandpass filter.

18. The zoom apparatus of claim 16 wherein the zoom apparatus has a total thickness of 1.0 cm or less and has an f-number of 2 or lower.

19. The zoom apparatus of claim 16 wherein the zoom apparatus has a total thickness of 5.0 mm or less and has an f-number of 2 or lower.

* * * * *